United States Patent Office.

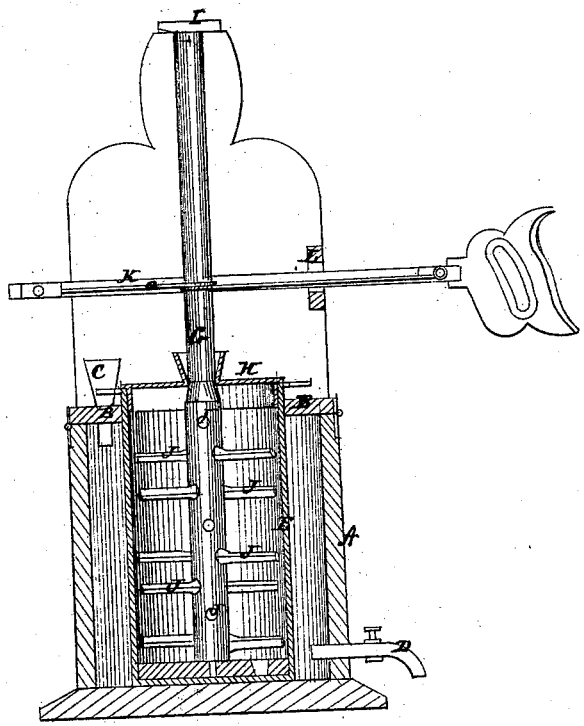

FRANKLIN MARION HINDMAN AND NICHOLAS HIATT, OF SIDNEY, IOWA.

Letters Patent No. 106,695, dated August 23, 1870.

IMPROVEMENT IN CHURNS.

The Schedule referred to in these Letters Patent and making part of the same.

To all whom it may concern:

Be it known that we, FRANKLIN MARION HINDMAN and NICHOLAS HIATT, of Sidney, in the county of Fremont and in the State of Iowa, have invented certain new and useful Improvements in Churns; and do hereby declare that the following is a full, clear, and exact description thereof, reference being had to the accompanying drawing and to the letters of reference marked thereon, making a part of this specification.

The nature of our invention consists in the construction and arrangement of a "rotary reaction churn," as will be hereinafter fully set forth.

In order to enable others skilled in the art to which our invention appertains to make and use the same, we will now proceed to describe its construction and operation, referring to the annexed drawing, which represents a longitudinal vertical section of our churn.

A represents a water-tight box of any suitable dimensions, provided with hinged lids B, through one of which is a funnel, C.

In the bottom of the box A is a faucet, D.

In the center of the box A is placed a tin cylinder, E, provided with a cap or lid, H, through the center of which passes the upright shaft G, revolving on pivots in the bottom of the cylinder, and in a cross-bar, I, above the box A, which cross-bar connects the extended sides of said box.

The shaft G is, within the cylinder E, provided with arms J J, forming the churn-dasher.

The milk is put in the cylinder E, and the box A around it filled with water, either hot or cold, in order to regulate the temperature of the milk without mixing water with the milk.

The water is poured into the box through the funnel C at top, and let off at the faucet D at the bottom.

The shaft G is turned back and forth by means of a bow, K, similar to a fiddle-bow, working through a slot or mortise in a cross-piece, L, above the box, the cord a of said bow being wrapped once around the shaft.

The bow, thus placed, works the shaft first one way and then the other, in the manner that small drills are frequently worked by blacksmiths.

The arms or paddles J J, that cut and stir up the milk, are so set and shaped as to work on the principle of a screw. As the shaft revolves rapidly in one direction, they cleave the milk and elevate it from the bottom of the churn, just as an auger cleaves the wood and elevates the chips in boring, and then, the shaft being suddenly reversed and turned rapidly the other way, cleaves the milk again, and at the same time dashing it forcibly back toward the bottom of the churn, and in this rapid action the milk is constantly permeated with air in the most complete manner.

By the use of this churn butter may be made in a very short space of time.

Having thus fully described our invention,

What we claim as new, and desire to secure by Letters Patent, is—

1. The arrangement of the water-tight box A, with funnel C and faucet D, in combination with the cylinder E and cover H, substantially as and for the purposes herein set forth.

2. The combination of the box A with funnel C and faucet D, cylinder E, shaft G, arms J J, and bow K, all constructed and arranged to operate substantially in the manner and for the purposes herein set forth.

In testimony that we claim the foregoing, we have hereunto set our hands and seals this 6th day of April, 1870.

FRANKLIN MARION HINDMAN. [L. S.]
NICHOLAS HIATT. [L. S.]

Witnesses:
J. A. HARVEY,
W. N. MORGAN.